United States Patent
Choi et al.

(10) Patent No.: US 12,525,605 B2
(45) Date of Patent: Jan. 13, 2026

(54) CATHODE ACTIVE MATERIAL FOR LITHIUM SECONDARY BATTERY AND METHOD OF MANUFACTURING THE SAME

(71) Applicant: SK INNOVATION CO., LTD., Seoul (KR)

(72) Inventors: Jae Ho Choi, Daejeon (KR); Jik Soo Kim, Daejeon (KR); Ji Hoon Choi, Daejeon (KR); Kook Hyun Han, Daejeon (KR)

(73) Assignee: SK On Co., Ltd., Seoul (KR)

( * ) Notice: Subject to any disclaimer, the term of this patent is extended or adjusted under 35 U.S.C. 154(b) by 18 days.

(21) Appl. No.: 17/572,513

(22) Filed: Jan. 10, 2022

(65) Prior Publication Data
US 2022/0263072 A1    Aug. 18, 2022

(30) Foreign Application Priority Data
Feb. 16, 2021    (KR) ........................ 10-2021-0020465

(51) Int. Cl.
| | |
|---|---|
| *H01M 4/36* | (2006.01) |
| *H01M 4/02* | (2006.01) |
| *H01M 4/505* | (2010.01) |
| *H01M 4/525* | (2010.01) |
| *H01M 4/60* | (2006.01) |
| *H01M 10/0525* | (2010.01) |

(52) U.S. Cl.
CPC ........... *H01M 4/366* (2013.01); *H01M 4/505* (2013.01); *H01M 4/525* (2013.01); *H01M 4/602* (2013.01); *H01M 10/0525* (2013.01); *H01M 2004/028* (2013.01)

(58) Field of Classification Search
CPC .......... H01M 10/052; H01M 10/0525; H01M 2004/028
See application file for complete search history.

(56) References Cited

U.S. PATENT DOCUMENTS 10,439,214 B2 * 10/2019 Ota ........................ H01M 4/62
2016/0204466 A1    7/2016 Nogami et al.

FOREIGN PATENT DOCUMENTS

| CN | 110854363 A | * 2/2020 | ............ H01M 4/366 |
|---|---|---|---|
| EP | 3171433 A1 | 5/2017 | |

(Continued)

OTHER PUBLICATIONS

KR102047256B1_Machine Translation (Year: 2019).*

(Continued)

*Primary Examiner* — Jonathan G Leong
*Assistant Examiner* — Aryana Y. Ortiz
(74) *Attorney, Agent, or Firm* — IP&T GROUP LLP

(57) ABSTRACT

A cathode active material for a lithium secondary battery according to exemplary embodiments of the present invention includes a lithium metal oxide particle core part and an organic compound coating layer which includes a functional group containing a sulfur atom. The cathode active material may suppress side reactions with an electrolyte while maintaining the stability of the layered structure of the lithium metal oxide particles, suppress a gelation phenomenon of the slurry during manufacturing a cathode, and maintain the high energy, high output and long life-span characteristics of the lithium secondary battery.

7 Claims, 1 Drawing Sheet

(56) References Cited

FOREIGN PATENT DOCUMENTS

| JP | 2006139940 A | * | 6/2006 | |
|---|---|---|---|---|
| KR | 10-2017-0063146 A | | 6/2017 | |
| KR | 10-2017-0080483 A | | 7/2017 | |
| KR | 101875869 B1 | * | 8/2018 | ............ H01M 4/525 |
| KR | 10-1921981 B1 | | 2/2019 | |
| KR | 102047256 B1 | * | 11/2019 | ............ H01M 4/366 |
| WO | 2017/116081 A1 | | 7/2017 | |
| WO | 2018/194248 A2 | | 10/2018 | |

OTHER PUBLICATIONS

JP2006139940A_Machine Translation (Year: 2006).*
KR101875869B1_Machine translation (Year: 2018).*
CN110854363A Machine translation (Year: 2020).*
Xiaoxi Zuo et al., Effect of diphenyl disulfide as an additive on the electrochemical performance of Li1.2Mn0.54Ni0.13Co0.13o2/graphite batteries at elevated temperature, Electrochimica Acta, 2017, vol. 245, p. 705-714, Elsevier.
Jian Xia et al., A Comparative Study of a Family of Sulfate Electrolyte Additive, Journal of The Electrochemical Society, 2014, vol. 161, p. A264-A274, The Electrochemical Society.
Extended European Search Report for European Patent Application No. 22152120.6 issued by the European Patent Office on Jul. 6, 2022.
Office Action for Korean Patent Application No. 10-2021-0020465 issued by the Korean Patent Office on May 1, 2025.

\* cited by examiner

[FIG. 1]
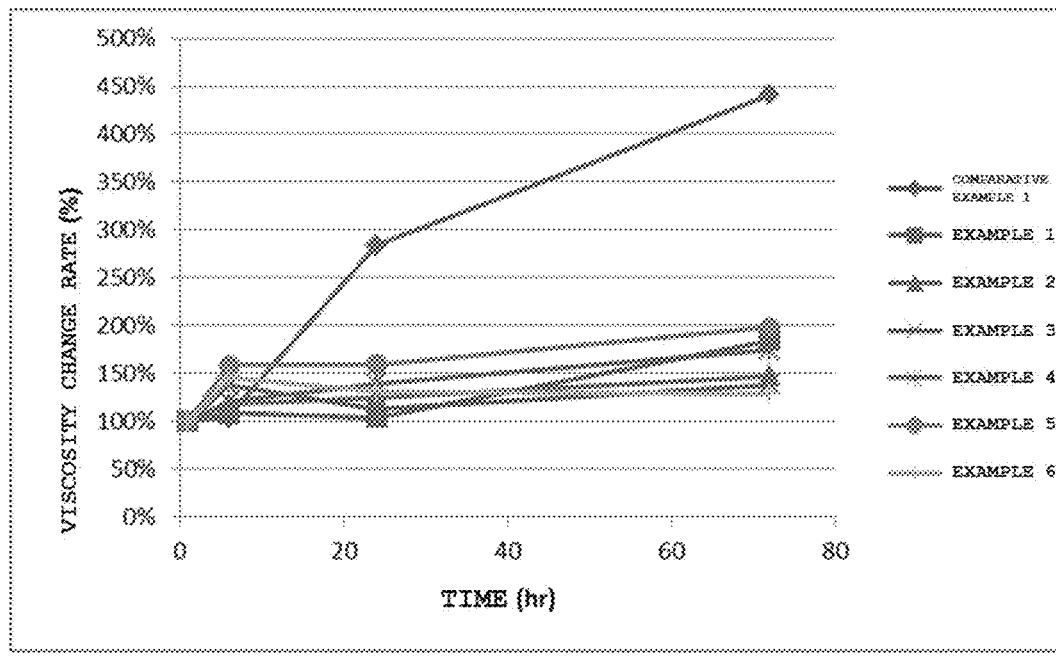
[FIG. 2]
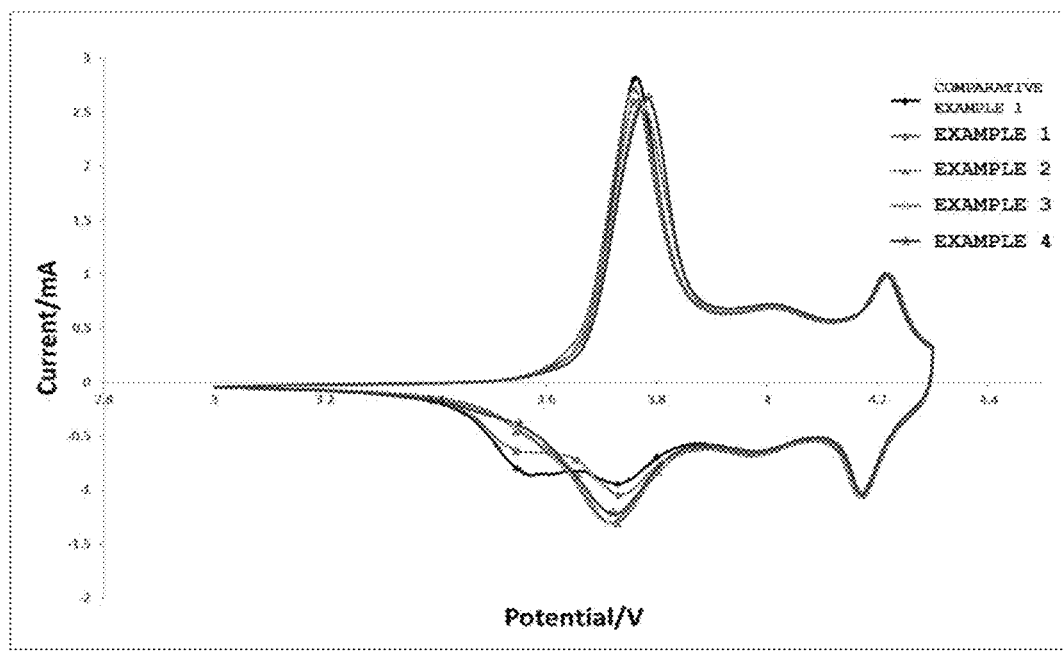

CATHODE ACTIVE MATERIAL FOR LITHIUM SECONDARY BATTERY AND METHOD OF MANUFACTURING THE SAME

CROSS-REFERENCE TO RELATED APPLICATION(S)

This application claims priority to Korean Patent Application No. 10-2021-0020465 filed on Feb. 16, 2021 in the Korean Intellectual Property Office (KIPO), the entire disclosure of which is incorporated by reference herein.

BACKGROUND OF THE INVENTION

1. Field of the Invention

The present invention relates to a cathode active material for a lithium secondary battery and a method of manufacturing the same, and more particularly, to a cathode active material for a lithium secondary battery, which includes a lithium metal oxide particle core part and an organic compound coating layer, and a method of manufacturing the same.

2. Description of the Related Art

A secondary battery is a battery which can be repeatedly charged and discharged. With rapid progress of information and communication, and display industries, the secondary battery has been widely applied to various portable telecommunication electronic devices such as a camcorder, a mobile phone, a laptop computer as a power source thereof. Recently, a battery pack including the secondary battery has also been developed and applied to an eco-friendly automobile such as a hybrid vehicle as a power source thereof.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight, such that development thereof has been proceeded in this regard.

The lithium secondary battery may include: an electrode assembly including a cathode, an anode, and a separation membrane (separator); and an electrolyte in which the electrode assembly is impregnated. In addition, the lithium secondary battery may further include, for example, a pouch-shaped outer case in which the electrode assembly and the electrolyte are housed.

As an active material for a cathode of a lithium secondary battery, a lithium metal oxide may be used. Examples of the lithium metal oxide may include a nickel-based lithium metal oxide.

A lithium secondary battery having longer life-span, high capacity, and operational stability is required as the application range thereof is expanded. In the lithium metal composite oxide used as the active material for a cathode, when non-uniformity in the chemical structure is caused due to deposition of lithium, etc., it may be difficult to implement a lithium secondary battery having desired capacity and life-span. In addition, a layered cathode active material such as NCM811 containing 80% or more of nickel reacts with lithium at a relatively low temperature compared to NCM111 (33% of Ni), NCM523 (50% of Ni) and NCM622 (60% of Ni) in order to maintain structural stability, thus to be synthesized as a LiMO2 cathode active material. For this reason, there are disadvantages in that excessive lithium impurities are generated on the surface, and a viscosity of slurry is increased during a process of manufacturing an electrode plate due to the impurities.

For example, Korean Patent Registration No. 10-1921981 discloses a method of manufacturing a cathode active material, which reduces unreacted residual lithium by washing it with a compound solution containing a thiol functional group, but there is a limitation in sufficient removal of the impurities, and damage to the surface of particles may be caused in a water washing process.

PRIOR ART DOCUMENT

Patent Document

Korean Patent Registration No. 10-1921981

SUMMARY OF THE INVENTION

An object of the present invention is to provide a cathode active material for a lithium secondary battery, which is capable of suppressing a gelation phenomenon of a slurry generated during manufacturing a cathode while maintaining high energy, high output and long life-span characteristics of a lithium secondary battery, and a method of manufacturing the same.

Another object of the present invention is to provide a lithium secondary battery having excellent operational stability and electrical characteristics.

To achieve the above objects, according to an aspect of the present invention, there is provided a cathode active material for a lithium secondary battery including: a lithium metal oxide particle core part; and an organic compound coating layer which includes a functional group containing a sulfur atom.

In some embodiments, a weight ratio of the lithium metal oxide particles to the organic compound may be 99.9:0.1 to 90:10.

In some embodiments, the organic compound may be a compound including any one or more of mercapto, sulfide, disulfide, and thioamide functional groups.

In some embodiments, the organic compound may include a disulfide compound represented by Structural Formula 1 or Structural Formula 2 below:

[Structural Formula 1]

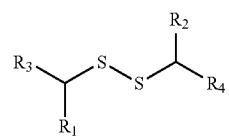

(in Structural Formula 1, $R_1$ to $R_4$ may be each independently hydrogen; an alkyl group having 1 to 10 carbon atoms; an alkyl group having 1 to 10 carbon atoms in which at least one hydrogen is substituted with a hydroxyl group; an alkoxy group having 1 to 10 carbon atoms; a hydroxyl group; an amine group in which at least one hydrogen is unsubstituted or substituted with an alkyl group having 1 to 10 carbon atoms; a mercapto group; or a carbonyl group),

[Structural Formula 2]

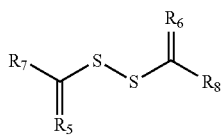

(in Structural Formula 2, $R_5$ and $R_6$ may be each independently oxygen or sulfur, and $R_7$ and $R_8$ are each independently hydrogen; an alkyl group having 1 to 10 carbon atoms; an alkyl group having 1 to 10 carbon atoms in which at least one hydrogen is substituted with a hydroxyl group; an alkoxy group having 1 to 10 carbon atoms; a hydroxyl group; an amine group in which at least one hydrogen is unsubstituted or substituted with an alkyl group having 1 to 10 carbon atoms; a mercapto group; or a carbonyl group).

In some embodiments, the organic compound may include 1 to 3 heteroatoms selected from nitrogen and sulfur, and may include 5- to 7-membered heterocycle or heteroaryl in which at least one hydrogen is substituted with a mercapto group.

In some embodiments, the organic compound may include at least one selected from the group consisting of compounds of Chemical Formulae 1 to 6 below:

[Chemical Formula 1]

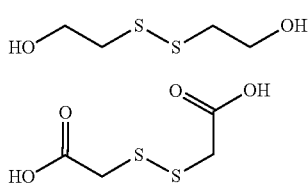

[Chemical Formula 2]

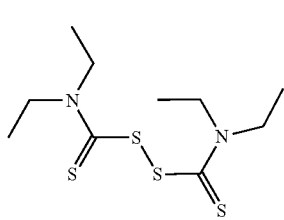

[Chemical Formula 3]

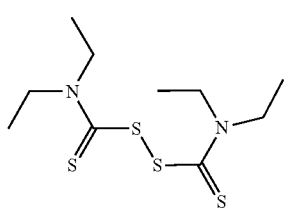

[Chemical Formula 4]

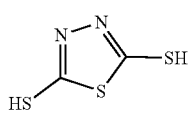

[Chemical Formula 5]

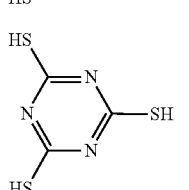

[Chemical Formula 6]

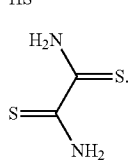

In some embodiments, the lithium metal oxide particles may include a lithium nickel-based metal oxide represented by General Formula 1 below:

$Li_xNi_yM_{y-1}O_2$      [General Formula 1]

(in General Formula 1, x and y may be in a range of 0.95<x<1.08, and y≥0.5, respectively, and M may be at least one element selected from the group consisting of Co, Mn, Al, Zr, Ti, B, Mg and Ba).

In some embodiments, in General Formula 1, y may be in a range of 0.8≤y≤0.93.

In some embodiments, in General Formula 1, M may include Co and Mn.

In some embodiments, the lithium metal oxide particles may include a doping or coating including at least one of Al, Zr and Ti.

In addition, according to another aspect of the present invention, there is provided a method of manufacturing a cathode active material for a lithium secondary battery, the method including: mixing lithium metal oxide particles and an organic compound which includes a functional group containing a sulfur atom.

In some embodiments, the lithium metal oxide particles and the organic compound may be mixed in a weight ratio of 99.9:0.1 to 90:10.

In some embodiments, the organic compound may be a compound including any one or more of mercapto, sulfide, disulfide, and thioamide functional groups.

In some embodiments, the mixing may be performed by milling in a dry method.

Further, according to another aspect of the present invention, there is provided a lithium secondary battery including: a cathode including the cathode active material for a lithium secondary battery according to exemplary embodiments; an anode; and a separation membrane disposed between the cathode and the anode.

According to embodiments of the present invention, the cathode active material including a coating layer which includes an organic compound including a lithium metal oxide particle core part and a functional group containing a sulfur atom may suppress side reactions with an electrolyte while maintaining stability of the layered structure of the lithium metal oxide particles, suppress a gelation phenomenon of the slurry during manufacturing a cathode, and maintain high energy, high output and long life-span characteristics of the lithium secondary battery.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph illustrating a change rate in viscosities of slurries according to exemplary embodiments measured using a Brookfield viscometer (Dv2TRV-cone & plate, CPA-52Z) at 25° C.; and FIG. 2 is a graph illustrating results of analyzing cathode active materials according to exemplary embodiments by cyclic voltammetry.

DETAILED DESCRIPTION OF THE INVENTION

<Cathode Active Material for Lithium Secondary Battery and Method of Manufacturing the Same>

A cathode active material for a lithium secondary battery according to exemplary embodiments (hereinafter, may be abbreviated as a cathode active material) may include a coating layer which includes an organic compound including a lithium metal oxide particle core part and a functional group containing a sulfur atom (hereinafter, may be abbreviated as an organic compound).

In some embodiments, in the cathode active material for a lithium secondary battery, a weight ratio of lithium metal oxide particles to the organic compound may be 99.9:0.1 to 90:10. When the weight ratio of the organic compound is less than 0.1, gelation of the slurry occurs during manufacturing a cathode, and when the weight ratio thereof exceeds 10, charge/discharge efficiency and capacity retention rate of the lithium secondary battery may be decreased.

As used herein, the term "core part" corresponds to a central portion occupied by the lithium metal oxide particles in the cathode active material particles, and the "coating layer" is used as a meaning of encompassing a coating layer formed substantially throughout the surface of the lithium metal oxide particles, and a coating layer formed on a partial region of the surface of the lithium metal oxide particle core part. In addition, the "core part" may be defined as a portion except for the "coating layer."

As used herein, the term "lithium metal oxide" refers to a composite oxide including lithium and at least one metal other than lithium. According to exemplary embodiments, the lithium metal oxide particles may include a lithium nickel-based metal oxide.

For example, the lithium nickel-based metal oxide may be represented by General Formula 1 below.

[General Formula 1]

$Li_xNi_yM_{y-1}O_2$

In General Formula 1, x and y may be in a range of $0.95<x<1.08$, and $y\geq0.5$, respectively, and M may be at least one element selected from the group consisting of Co, Mn, Al, Zr, Ti, B, Mg and Ba.

Nickel (Ni) may be provided as a metal associated with a capacity of the lithium secondary battery. For example, the higher the content of nickel, the better the capacity and output of the lithium secondary battery.

In one embodiment, in General Formula 1, y may be in a range of $0.8\leq y\leq0.93$ in order to implement a high-capacity and high-output cathode active material.

In order to compensate electrical conductivity and chemical stability under a high-content of nickel, M may include cobalt (Co) and manganese (Mn). For example, cobalt (Co) may be a metal associated with conductivity or resistance of the lithium secondary battery. In one embodiment, M includes manganese (Mn), and Mn may be provided as a metal associated to mechanical and electrical stability of the lithium secondary battery.

Accordingly, the lithium metal oxide particles may include a nickel-cobalt-manganese-based lithium oxide, and a cathode active material having improved capacity, output, low resistance, and life-span stability may be provided.

In some embodiments, the lithium metal oxide particles may further include a doping or coating other than Ni, Co and Mn. For example, the doping or coating may contain an element of Al, Zr and/or Ti, and preferably contain all elements of Al, Zr and Ti.

In the nickel-cobalt-manganese-based lithium oxide, a content of the doping or coating element may be about 0.1 to 1 mol % based on the total number of moles of Ni, Co, Mn and doping elements (e.g., Al, Zr and/or Ti), and preferably about 0.5 to 1 mol %. Within the above range, chemical and structural stability may be further improved without excessive reduction in activity of the lithium metal oxide particles.

The coating may be derived from a metal oxide for coating such as $Al_2O_3$, $ZrO_2$ and/or $TiO_2$. An amount of the metal oxide for coating, which is added to form coating on the particles, may be about 0.5 to 1% by weight ('wt. %') based on a total weight of the nickel-cobalt-manganese-based lithium oxide.

The coating may be formed on the surface of the above-described lithium metal oxide particles.

In some embodiments, the lithium metal oxide particles may have a layered structure. For example, lithium nickel-based metal oxide primary particles may be aggregated while forming a layered structure to form the lithium metal oxide particles as a cathode active material. Mobility of lithium ions generated in the cathode active material may be further improved through the particle structure.

According to exemplary embodiments, the organic compound including the functional group containing a sulfur atom may be derived from at least one of compounds including one or more of mercapto, sulfide, disulfide, and thioamide functional groups.

In some embodiments, the organic compound may include a compound represented by Structural Formula 1 or Structural Formula 2 below.

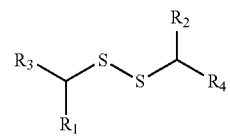
[Structural Formula 1]

In Structural Formula 1, $R_1$ to $R_4$ are each independently hydrogen, an alkyl group having 1 to 10 carbon atoms, an alkyl group having 1 to 10 carbon atoms in which at least one hydrogen is substituted with a hydroxyl group, an alkoxy group having 1 to 10 carbon atoms, a hydroxyl group, an amine group in which at least one hydrogen is unsubstituted or substituted with an alkyl group having 1 to 10 carbon atoms, a mercapto group, or a carbonyl group.

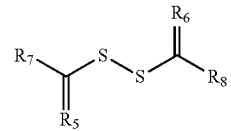
[Structural Formula 2]

In Structural Formula 2, $R_5$ and $R_6$ are each independently oxygen or sulfur, and $R_7$ and $R_8$ are each independently hydrogen, an alkyl group having 1 to 10 carbon atoms, an alkyl group having 1 to 10 carbon atoms in which at least one hydrogen is substituted with a hydroxyl group, an alkoxy group having 1 to 10 carbon atoms, a hydroxyl group, an amine group in which at least one hydrogen is unsubstituted or substituted with an alkyl group having 1 to 10 carbon atoms, a mercapto group, or a carbonyl group.

In some embodiments, the organic compound may include 1 to 3 heteroatoms selected from nitrogen and sulfur, and includes 5- to 7-membered heterocycle or heteroaryl in which at least one hydrogen is substituted with a mercapto group.

In some embodiments, the organic compound may include at least one of compounds represented by Chemical Formula 1 (2,2'-dithiodiethanol), Chemical Formula 2 (dithiodiglycolic acid), Chemical Formula 3 (tetraethyl thinuram disulfide), Chemical Formula 4 (thioacetamide), Chemical Formula 5 (2,5-dimercapto-1,3,4-thiadiazole), and Chemical Formula 6 (dithiooxaminde).

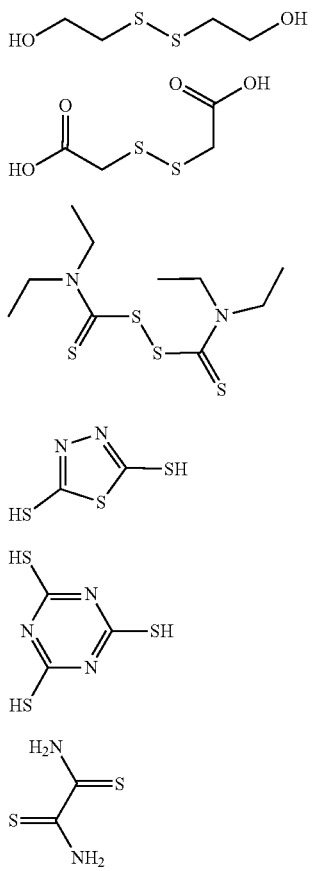

[Chemical Formula 1]

[Chemical Formula 2]

[Chemical Formula 3]

[Chemical Formula 4]

[Chemical Formula 5]

[Chemical Formula 6]

The above-described organic compound prevents a gelation phenomenon of the slurry by, for example, suppressing a polymerization phenomenon of a binder during manufacturing the cathode, and allows the lithium secondary battery to maintain high energy, high output and long-life characteristics.

In addition, as described above, when the lithium metal oxide particles include additional metal doping or coating, chemical stability of the cathode active material may be further improved by combining with the metal doping or coating elements.

Hereinafter, a method of manufacturing the cathode active material will be described in more detail.

According to exemplary embodiments, the method of manufacturing the cathode active material may include mixing lithium metal oxide particles and an organic compound including a functional group containing a sulfur atom.

In some embodiments, the lithium metal oxide particles may be prepared by reacting a lithium precursor with a nickel precursor. The lithium precursor and the nickel precursor may include oxides or hydroxides of lithium and nickel, respectively. For example, the preliminary lithium metal oxide may be obtained by reacting the lithium precursor with the nickel precursor in a solution through a precipitation reaction such as a co-precipitation method.

In some embodiments, other metal precursors (e.g., cobalt precursor, manganese precursor, etc.) other than the lithium precursor and the nickel precursor may be used together and reacted. In some embodiments, the lithium precursor and the nickel-cobalt-manganese precursor (e.g., nickel-cobalt-manganese hydroxide) may be used together.

The other metal precursors may include Al, Zr and/or Ti precursors other than the cobalt precursor and the manganese precursor in consideration of doping formation.

In some embodiments, after manufacturing the lithium metal oxide particles, a calcination process may be further performed. For example, the calcination process may be performed at a temperature of about 600 to 1000° C. The layered structure of the lithium metal oxide particles may be stabilized, and the doping element may be fixed by the calcination process.

In some embodiments, after mixing the prepared lithium metal oxide particles with the metal oxide for coating such as $Al_2O_3$, $ZrO_2$ and/or $TiO_2$, coating may be formed through additional heat treatment.

Unreacted precursors may remain or be deposited on the surface of the lithium metal oxide particles synthesized through the above-described precursor reaction. In addition, impurities and solution molecules may remain on the lithium metal oxide particles in the synthesis process.

According to exemplary embodiments, the lithium metal oxide particles may be cleaned or washed using a cleaning solution including distilled water, deionized water, or an organic solvent such as an alcohol solvent.

In some embodiments, in order to improve a yield of the lithium metal oxide particles or stabilize the synthesis process, the lithium precursor may be used in an excess amount. In this case, lithium salt impurities including lithium hydroxide (LiOH) and lithium carbonate ($Li_2CO_3$) may remain on the surface of the preliminary lithium metal oxide. Lithium salt impurities may cause gelation when forming a slurry for preparing a cathode active material. In addition, the lithium salt impurities may react with the electrolyte of the lithium secondary battery to generate gas, thereby causing a deterioration in the battery life-span and storage stability.

According to exemplary embodiments, the above-described organic compound forms a coating layer on the surface of the lithium metal oxide particles to maintain high energy, high output and long life-span characteristics of the lithium secondary battery, while suppressing gelation of the slurry. In particular, it is possible to improve a cathode manufacturing process by suppressing the gelation of the slurry, which is a problem that occurs when manufacturing a ternary cathode having a nickel content of 80% or more.

In some embodiments, the lithium metal oxide particles and the organic compound may be mixed in a weight ratio of 99.9:0.1 to 90:10. When the weight ratio of the organic compound is less than 0.1, gelation of the slurry occurs, and when the weight ratio thereof exceeds 10, the charge/discharge efficiency and capacity retention rate of the lithium secondary battery may be decreased.

Accordingly, within the above range, it is possible to obtain a sufficient effect of suppressing gelation of the slurry without excessively inhibiting the properties of the lithium metal oxide particles included in the cathode active material.

Meanwhile, in some embodiments, the mixing may be performed by ball milling in a dry method. In the case of ball milling in the dry method, the organic compound may be bonded to the lithium metal oxide particles to properly form a coating layer.

A ball milling apparatus may be used without any particular limitation so long as it is commonly used in the dry method in the related art, and as a ball in the ball milling apparatus, a zirconia ($ZrO_2$) ball having a particle diameter of 5 to 50 mm, and preferably 10 to 30 mm, may be used, and zirconia balls having different particle diameters may also be used by mixing. In addition, a weight ratio of balls to the entire mixture may be 1:50 to 1:130, preferably 1:70 to 1:110, and more preferably 1:80 to 100.

The ball milling may be performed under a temperature condition of 20 to 50° C. Since an organic compound coating layer can be formed on the lithium metal oxide particle core part even at room temperature, deformation of the lithium metal oxide structure may be minimized in the mixing process, and the organic compound coating layer may be easily formed on the lithium metal oxide particle core part by using the ball milling apparatus that can be used during mixing without a separate heating device.

A rotational speed during the ball milling may be 800 to 2,000 rpm, and preferably 1,000 to 1,800 rpm. When the rotational speed is less than 800 rpm, the lithium metal oxide particles and the organic compound are simply mixed, and the organic compound coating layer is not properly formed on the lithium metal oxide particles. On the other hand, when the rotational speed exceeds 2,000 rpm, lithium metal oxide particles may be crushed, thus being not preferable.

The ball milling may be performed for a period of time of 0.5 to 10 minutes, and preferably 1 to 5 minutes. When the time for performing ball milling is less than 0.5 minutes, the organic compound coating layer is not sufficiently formed on the lithium metal oxide particles. In addition, when the time for performing ball milling exceeds 10 minutes, process efficiency over time is decreased.

The ball milling may be performed by rotating in a predetermined direction and then performing in a reverse direction. For example, the ball milling may be performed in the forward direction at a speed of 800 to 2,000 rpm for 0.5 to 10 minutes, and then in the reverse direction at a speed of 800 to 2,000 rpm for 0.5 to 10 minutes.

<Lithium Secondary Battery>

According to exemplary embodiments, the lithium secondary battery may include a cathode including the above-described cathode active material, an anode and a separation membrane.

The cathode may include a cathode active material layer formed by applying the cathode active material to a cathode current collector.

For example, a slurry may be prepared by mixing the cathode active material with a binder, a conductive material and/or a dispersant in a solvent, followed by stirring the same. The slurry may be coated on the cathode current collector, followed by compressing and drying to manufacture the cathode.

The cathode current collector may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a cathode forming binder. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as $LaSrCoO_3$, and $LaSrMnO_3$.

The anode may include an anode current collector and an anode active material layer formed by coating the anode current collector with an anode active material.

The anode active material useable in the present invention may include any material known in the related art, so long as it can intercalate and deintercalate lithium ions, without particular limitation thereof. For example, carbon-based materials such as crystalline carbon, amorphous carbon, carbon composite, carbon fiber, etc.; a lithium alloy; silicon or tin may be used. Examples of the amorphous carbon may include hard carbon, cokes, mesocarbon microbead (MCMB) calcined at a temperature of 1500° C. or less, mesophase pitch-based carbon fiber (MPCF) or the like. The crystalline carbon may include graphite-based carbon such as natural graphite, graphite cokes, graphite MCMB, graphite MPCF or the like. Other elements included in the lithium alloy may include, for example, aluminum, zinc, bismuth, cadmium, antimony, silicone, lead, tin, gallium, indium or the like. The anode current collector may include, for example, gold, stainless steel, nickel, aluminum, titanium, copper, or an alloy thereof, and preferably includes copper or a copper alloy.

In some embodiments, a slurry may be prepared by mixing the anode active material with a binder, a conductive material and/or a dispersant in a solvent, followed by stirring the same. The slurry may be coated on the anode current collector, followed by compressing and drying to manufacture the anode.

As the binder and the conductive material, materials which are substantially the same as or similar to the above-described materials may be used. In some embodiments, the binder for forming the anode may include, for example, an aqueous binder such as styrene-butadiene rubber (SBR) for consistency with the carbon-based active material, and may be used together with a thickener such as carboxymethyl cellulose (CMC).

A separation membrane may be interposed between the cathode and the anode. The separation membrane may include a porous polymer film made of a polyolefin polymer such as ethylene homopolymer, propylene homopolymer, ethylene/butene copolymer, ethylene/hexene copolymer, ethylene/methacrylate copolymer. The separation membrane may include a nonwoven fabric made of glass fiber having a high melting point, polyethylene terephthalate fiber or the like.

According to exemplary embodiments, an electrode cell is defined by the cathode, the anode, and the separation membrane, and a plurality of electrode cells are stacked to form, for example, a jelly roll type electrode assembly. For example, the electrode assembly may be formed by winding, lamination, folding, or the like of the separation membrane.

An electrode assembly may be housed together with an electrolyte in an outer case to define the lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion ($X^-$) of the lithium salt, $Cl^-$, $Br^-$, $I^-$, $NO_3^-$, $N(CN)_2^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

Electrode tabs may protrude from the cathode current collector and the anode current collector, respectively, which belong to each electrode cell, and may extend to one side of the outer case. The electrode tabs may be fused together with the one side of the outer case to form electrode leads extending or exposed to an outside of the outer case.

The lithium secondary battery may be manufactured, for example, in a cylindrical shape using a can, a square shape, a pouch type or a coin shape.

According to exemplary embodiments, the chemical stability of the cathode active material may be improved by the organic compound coating layer to suppress the gelation phenomenon of the slurry during manufacturing the cathode, and implement a lithium secondary having excellent life-span and long-term stability while suppressing a decrease in capacity and average voltage.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

EXAMPLES AND COMPARATIVE EXAMPLES

In the examples and comparative examples, a lithium metal oxide having a composition of $Li[Ni_{0.8}Co_{0.1}Mn_{0.1}]O_2$) (NCM811) was used as lithium metal oxide particles.

Example 1

The NCM811 lithium metal oxide particles and an organic compound 2,5-dimercapto-1,3,4-thiadiazole were mixed in a weight ratio of 99.9:0.1 while performing ball milling in a dry method, such that a cathode active material including a lithium metal oxide particle core part and an organic compound coating layer was prepared.

Five (5) zirconium balls having an average diameter of 3 cm and ten (10) zirconium balls having an average diameter of 1 cm were put together in a milling barrel based on the total weight of the cathode active material of 5 g, and ball milling was performed at a speed of 1,200 rpm in the forward direction for 1 minute and 20 seconds, and then in the reverse direction at a speed of 1,000 rpm for 1 minute.

A slurry was prepared by mixing the cathode active material, carbon black as a conductive material, and polyvinylidene fluoride (PVDF) as a binder in a weight ratio of 92:5:3. The prepared slurry was uniformly applied to an aluminum foil having a thickness of 15 μm, and is vacuum-dried at 130° C. to prepare a cathode for a lithium secondary battery.

Example 2

A cathode for a lithium secondary battery was prepared according to the same procedures as described in Example 1, except that the mixing ratio of the lithium metal oxide particle to the organic active material was changed to a weight ratio of 99.5:0.5.

Example 3

A cathode for a lithium secondary battery was prepared according to the same procedures as described in Example 1 except that the mixing ratio of the lithium metal oxide particle to the organic active material was changed to a weight ratio of 99.0:1.0.

Example 4

A cathode for a lithium secondary battery was prepared according to the same procedures as described in Example 1, except that the mixing ratio of the lithium metal oxide particle to the organic active material was changed to a weight ratio of 95.0:5.0.

Example 5

A cathode for a lithium secondary battery was prepared according to the same procedures as described in Example 1, except that the mixing ratio of the lithium metal oxide particle to the organic active material was changed to a weight ratio of 90.0:10.0.

Example 6

A cathode for a lithium secondary battery was prepared according to the same procedures as described in Example 3 except that 2,2'-dithiodiethanol was used as the organic active material.

Example 7

A cathode for a lithium secondary battery was prepared according to the same procedures as described in Example 3, except that tetraethyl thiuram disulfide was used as the organic active material.

Example 8

A cathode for a lithium secondary battery was prepared according to the same procedures as described in Example 3 except that trithiocyanuric acid was used as the organic active material.

Example 9

A cathode for a lithium secondary battery was prepared according to the same procedures as described in Example 3 except that dithiodiglycolic acid was used as the organic active material.

Example 10

A cathode for a lithium secondary battery was prepared according to the same procedures as described in Example 3 except that dithiooxamide was used as the organic active material.

Comparative Example 1

A cathode for a lithium secondary battery was prepared according to the same procedures as described in Example 1, except that only 100% of NCM811 lithium metal oxide particles were used as the cathode active material without using the organic active material.

Comparative Example 2

A cathode for a lithium secondary battery was prepared according to the same procedures as described in Example 1, except that the mixing ratio of the lithium metal oxide particle to the organic active material was changed to a weight ratio of 99.95:0.05.

Comparative Example 3

A cathode for a lithium secondary battery was prepared according to the same procedures as described in Example 1 except that the mixing ratio of the lithium metal oxide particle to the organic active material was changed to a weight ratio of 80:20.

Experimental Example (1) Measurement of Slurry Viscosity

Viscosities of the slurries prepared in Examples 1 to 10 and Comparative Example 1 were measured at 25° C. using a Brookfield viscometer (Dv2TRV-cone & plate, CPA-52Z). Results thereof are shown in FIG. 1.

As shown in FIG. 1, the slurries of Examples 1 to 6 still exhibited a change in viscosity of 200% or less after days (72 hours) from the preparation, whereas in the slurry of Comparative Example 1, gelation occurred within 1 day, thereby the viscosity was rapidly increased, and after days, a change in the viscosity of 400% or more was exhibited.

(2) Evaluation of Battery Characteristics 2-1) Manufacture of Secondary Battery

An electrode assembly was formed using each cathode for a lithium secondary battery prepared in the examples and comparative examples, a lithium foil as a counter electrode, and a porous polyethylene membrane (thickness: 21 μm) as a separator, then using the formed electrode assembly and a liquid electrolyte obtained by dissolving $LiPF_6$ at a concentration of 1.0M in a solvent in which ethylene carbonate and ethylmethyl carbonate are mixed in a volume ratio of 3:7, a battery cell having a coin half-cell shape was manufactured according to the conventionally known manufacturing process, followed by performing an evaluation at a voltage of 3.0 V to 4.3 V.

2-2) Measurement of Initial Charge/Discharge

For the battery cells according to the examples and comparative examples, charge (CC/CV 0.1C 4.3 V 0.05CA CUT-OFF) and discharge (CC 0.1C 3.0 V CUT-OFF) were performed once, then initial charge capacity and discharge capacity were measured (CC: constant current, CV: constant voltage)

2-3) Measurement of Initial Efficiency

The initial efficiency was measured by a percentage value obtained by dividing the initial discharge amount measured in 2-2) by the initial charge amount.

2-4) Measurement of Capacity Retention Rate

The battery cells according to the examples and comparative examples were repeatedly charged (CC/CV 0.5C 4.3 V 0.05C CUT-OFF) and discharged (CC 1.0C 3.0 V CUT-OFF) 200 times, then capacity (life-span) retention rate was evaluated as a percentage of the discharge capacity at 200 times divided by the discharge capacity at one time.

2-5) Measurement Result

The measured values according to the above-described experimental examples are shown in Table 1 below.

TABLE 1

| | Initial charge capacity mAh/g | Initial discharge capacity mAh/g | Initial efficiency % | Capacity retention rate % @200th |
|---|---|---|---|---|
| Example 1 | 220 | 196 | 89 | 71 |
| Example 2 | 216 | 197 | 91 | 73 |
| Example 3 | 213 | 196 | 92 | 75 |
| Example 4 | 213 | 195 | 92 | 70 |
| Example 5 | 215 | 190 | 88 | 69 |
| Example 6 | 214 | 195 | 91 | 72 |
| Example 7 | 218 | 197 | 90 | 80 |
| Example 8 | 215 | 195 | 91 | 74 |
| Example 9 | 213 | 193 | 91 | 72 |
| Example 10 | 215 | 193 | 90 | 70 |
| Comparative Example 1 | 221 | 196 | 89 | 70 |
| Comparative Example 2 | 219 | 194 | 88 | 71 |
| Comparative Example 3 | 198 | 168 | 84 | 52 |

Referring to Table 1, it can be confirmed that, even in the case of the cathode active material including the organic active material coating layer of Examples 1 to 10, excellent charge/discharge efficiency and capacity retention rate are obtained similar to the case of the cathode active material which does not include the organic active material coating layer of Comparative Examples 1.

Meanwhile, referring to FIG. 2, as a result of cyclic voltammetry analysis, it can be confirmed that a discharge peak occurring at 3.5 V disappears and a peak near 3.7 V becomes clear as the content of the organic active material is increased. Herein, the discharge peak occurring at 3.5 V means unnecessary side reactions, and the peak occurring at 3.7 V means a change in the layered structure for capacity implementation. Through these results, it can be seen that, when the organic-based active material coating layer is included in the cathode active material, unnecessary side reactions are reduced and capacity is more effectively implemented.

What is claimed is:

1. A cathode active material for a lithium secondary battery comprising:
 a lithium metal oxide particle core part; and
 an organic compound coating layer including an organic compound which includes a functional group containing a sulfur atom,
 wherein the organic compound is directly formed on a surface of the lithium metal oxide particle core part,
 wherein the organic compound is a disulfide compound represented by Structural Formula 1 or Structural Formula 2, or a compound represented by Chemical Formula 4 below:

[Structural Formula 1]

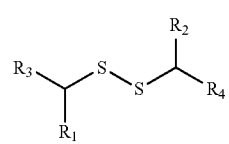

wherein, in Structural Formula 1, $R_1$ to $R_4$ are each independently hydrogen; an alkyl group having 1 to 10 carbon atoms; an alkyl group having 1 to 10 carbon atoms in which at least one hydrogen is substituted with a hydroxyl group; an alkoxy group having 1 to 10 carbon atoms; a hydroxyl group; an amine group in which at least one hydrogen is unsubstituted or substituted with an alkyl group having 1 to 10 carbon atoms; a mercapto group; or a carboxyl group,

[Structural Formula 2]

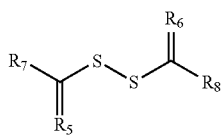

wherein, in Structural Formula 2, $R_5$ and $R_6$ are each independently oxygen, and $R_7$ and $R_8$ are each independently hydrogen; an alkyl group having 1 to 10 carbon atoms; an alkyl group having 1 to 10 carbon atoms in which at least one hydrogen is substituted with a hydroxyl group; an alkoxy group having 1 to 10 carbon atoms; a hydroxyl group; an amine group in which at least one hydrogen is unsubstituted or substituted with an alkyl group having 1 to 10 carbon atoms; a mercapto group; or a carboxyl group,

[Chemical Formula 4]

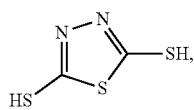

wherein a weight ratio of the lithium metal oxide particles to the organic compound is 99.9:0.1 to 90:10.

2. The cathode active material for a lithium secondary battery according to claim 1, wherein the organic compound is at least one selected from the group consisting of compounds of Chemical Formulae 1 and 2 below:

[Chemical Formula 1]

[Chemical Formula 2]

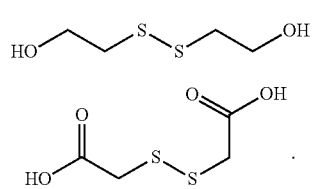

3. The cathode active material for a lithium secondary battery according to claim 1, wherein the lithium metal oxide particles include a lithium nickel-based metal oxide represented by General Formula 1 below:

$$Li_xNi_yM_{y-1}O_2$$ [General Formula 1]

wherein, in General Formula 1, x and y are in a range of $0.95<x<1.08$, and $y \geq 0.5$, respectively, and M is at least one element selected from the group consisting of Co, Mn, Al, Zr, Ti, B, Mg and Ba.

4. The cathode active material for a lithium secondary battery according to claim 3, wherein, in General Formula 1, y is in a range of $0.8 \leq y \leq 0.93$.

5. The cathode active material for a lithium secondary battery according to claim 3, wherein in General Formula 1, M includes Co and Mn.

6. The cathode active material for a lithium secondary battery according to claim 3, wherein the lithium metal oxide particles include a doping or coating including at least one of Al, Zr and Ti.

7. A lithium secondary battery comprising:
a cathode comprising the cathode active material for a lithium secondary battery according to claim 1;
an anode; and
a separation membrane disposed between the cathode and the anode.

* * * * *